United States Patent
Wu et al.

(10) Patent No.: US 7,944,614 B2
(45) Date of Patent: May 17, 2011

(54) LIGHT CONVERGING SHEET UNIT

(75) Inventors: Cing-Cin Wu, Tainan (TW);
Tsung-Hsun Wu, Tainan (TW)

(73) Assignee: EFUN Technology Co., Ltd., Tainan (TW)

( * ) Notice: Subject to any disclaimer, the term of this patent is extended or adjusted under 35 U.S.C. 154(b) by 0 days.

(21) Appl. No.: 12/622,254

(22) Filed: Nov. 19, 2009

(65) Prior Publication Data

US 2010/0123953 A1    May 20, 2010

(30) Foreign Application Priority Data

Nov. 20, 2008    (TW) .............................. 97144863 A

(51) Int. Cl.
*G02B 27/10* (2006.01)
(52) U.S. Cl. .................. 359/625; 359/622; 359/619
(58) Field of Classification Search .......... 359/619–630, 359/642; 362/31, 245, 330, 339
See application file for complete search history.

(56) References Cited

U.S. PATENT DOCUMENTS

| | | | |
|---|---|---|---|
| 5,890,791 A * | 4/1999 | Saito | 362/620 |
| 7,594,733 B2 * | 9/2009 | Goto | 362/97.1 |

* cited by examiner

*Primary Examiner* — Mohammed Hasan
(74) *Attorney, Agent, or Firm* — Kilpatrick Townsend & Stockton LLP

(57) ABSTRACT

A light converging sheet unit includes first and second light converging sheets stacked one on top of the other. The first light converging sheet has first light converging micro-prism structures with a first average peak-to-peak distance between adjacent ones of the first light converging micro-prism structures. The second light converging sheet has second light converging micro-prism structures with a second average peak-to-peak distance between adjacent ones of the second light converging micro-prism structures. At least one of the first and second average peak-to-peak distances is not larger than 35 μm.

6 Claims, 6 Drawing Sheets

LIGHT CONVERGING SHEET UNIT

CROSS-REFERENCE TO RELATED APPLICATION

This application claims priority to Taiwanese Application No. 097144863, filed Nov. 20, 2008, the disclosure of which is incorporated herein by reference.

BACKGROUND OF THE INVENTION

1. Field of the Invention

This invention relates to a light converging sheet unit, more particularly to a light converging sheet unit capable of converging light and reducing Newton-rings.

2. Description of the Related Art

Generally, a conventional backlight module for a liquid crystal display (LCD) includes a light source, a light guide plate that is disposed above the light source, a lower diffusion sheet that is disposed above the light guide plate, first and second light converging sheets that are stacked one on top of the other, that are disposed above the lower diffusion sheet, and that respectively have micro-prism structures, and an upper diffusion sheet that is disposed above the first and second light converging sheets. The micro-prism structures of the first light converging sheet extend in a first direction, and the micro-prism structures of the second light converging sheet extend in a second direction approximately transverse to the first direction. Accordingly, the first and second light converging sheets cooperate to converge light in both of the first and second directions, thereby enabling the LCD employing the backlight module to produce sufficient brightness.

Stacking of the first and second light converging sheets, and optical interference caused by optical sheets of the backlight modules result in Newton-rings. Since the upper diffusion sheet is configured to diffuse light and to induce haze effect, Newton-rings can be shielded and prevented from being observed on the LCD. Consequently, the LCD is able to have a good picture quality and a fine visual effect.

Another conventional backlight module may include only one light converging sheet. However, Newton-rings may be still produced when the single light converging sheet and other optical sheets of the backlight module are stacked one on top of the other. As such, smooth surfaces of regular micro-prism structures of the light converging sheet may give rise to rainbows. Therefore, a diffusion sheet is required to shield Newton-rings and the rainbows.

Amount of optical sheets of a backlight module can be reduced so as to lower production costs. For instance, the upper diffusion sheet of the conventional backlight modules can be eliminated to reduce a production cost of the LCD. Nevertheless, optical flaws such as Newton-rings are more easily observed, thereby adversely affecting the picture quality of the LCD.

Simultaneously reducing a production cost of an LCD and maintaining a picture quality of the same is hence an important goal. In order to reach the aforementioned goal, the conventional light converging sheets may be modified by varying the micro-prism structure thereof, or by disposing diffusion elements thereon (e.g., by applying diffusion coatings onto the back of the conventional light converging sheets).

When the upper diffusion sheet of the conventional backlight modules is removed, and when a peak-to-peak distance between adjacent ones of the micro-prism structures of the upper one of the first and second light converging sheets resides in an appropriate range, the first and second light converging sheets tend to generate less or even no Newton-rings. Furthermore, the modification of the micro-prism structures of the first and second light converging sheets can assist in reducing the amount of Newton-rings and alleviate effects of the rainbows. The inventors are unaware of previous studies directed to the effects of regulating the peak-to-peak distance between the adjacent ones of the micro-prism structures on Newton-rings and rainbows.

SUMMARY OF THE INVENTION

The object of the present invention is to provide a light converging sheet unit for overcoming the aforesaid drawbacks of the prior art.

According to one aspect of this invention, a light converging sheet unit includes first and second light converging sheets. The first light converging sheet has a base layer, and a plurality of first light converging micro-prism structures that protrude from a top surface of the base layer and that extend in a first direction. The second light converging sheet has a base layer, and a plurality of second light converging micro-prism structures that protrude from a top surface of the base layer of the second light converging sheet and that extend in a second direction different from the first direction. The first and second light converging sheets are stacked one on top of the other. The first light converging micro-prism structures have a first average peak-to-peak distance between adjacent ones of the first light converging micro-prism structures. The second light converging micro-prism structures have a second average peak-to-peak distance between adjacent ones of the second light converging micro-prism structures. At least one of the first and second average peak-to-peak distances is not larger than 35 µm.

According to another aspect of this invention, a light converging sheet includes a base layer and a plurality of light converging micro-prism structures that protrude from a top surface of the base layer. The light converging micro-prism structures have an average peak-to-peak distance between adjacent ones of the light converging micro-prism structures, which is not larger than 35 µm. Each of the light converging micro-prism structures includes a main body that has a peak. At least one of the light converging micro-prism structures further includes a plurality of protrusions that project from the main body thereof.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
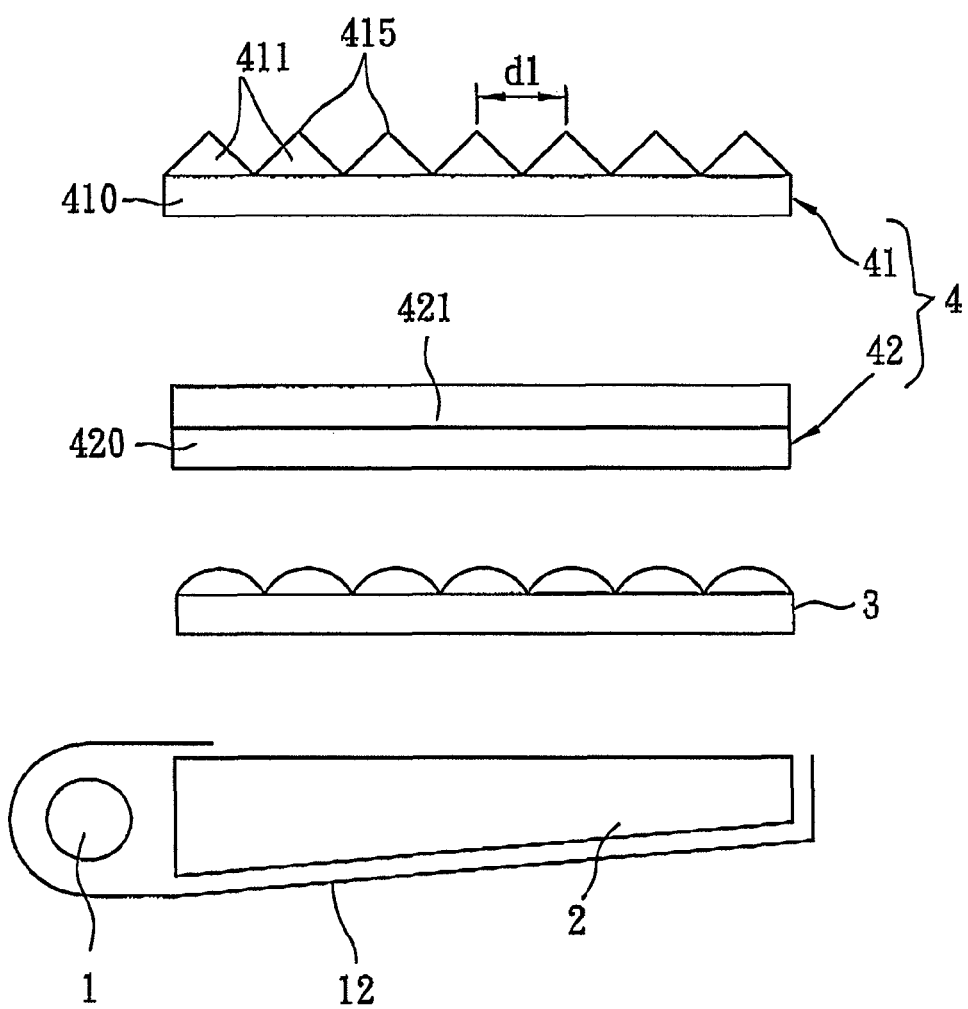
FIG. 1 is a schematic exploded view of a backlight module that employs the first preferred embodiment of a light converging sheet unit according to this invention.

Before the present invention is described in greater detail, it should be noted that the same reference numerals have been used to denote like elements throughout the specification.

Figure 2:
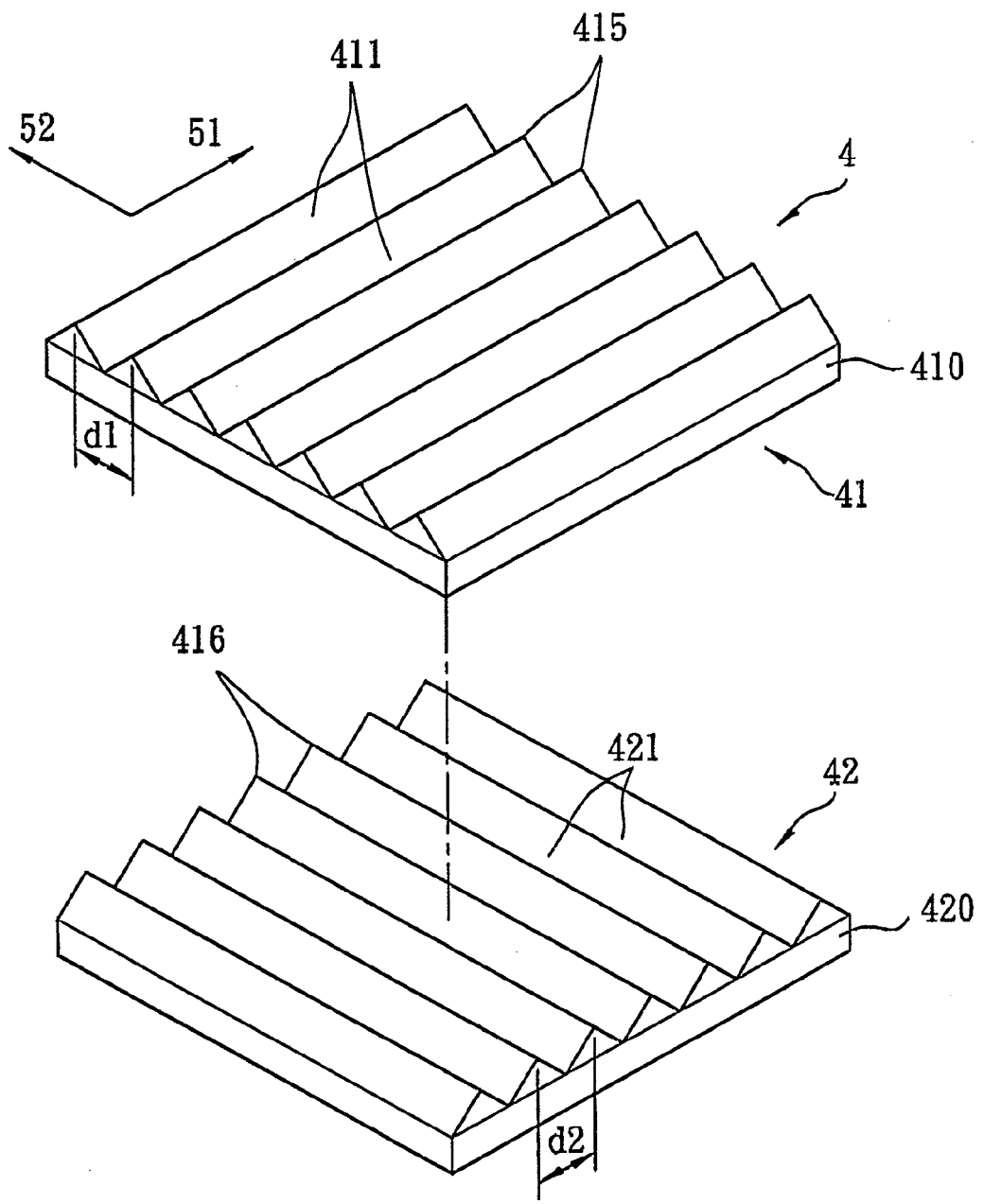
FIG. 2 is an exploded perspective view of the first preferred embodiment.

Referring to FIGS. 1 and 2, the first preferred embodiment of a light converging sheet unit 4 according to the present invention is applied to a backlight module and includes a first light converging sheet 41 and a second light converging sheet 42. The backlight module includes a light source 1, a light guide plate 2 that is adapted to direct light generated by the light source 1 and that is disposed adjacent to the light source 1, a diffusion sheet 3 that is disposed on the light guide plate 2, the second light converging sheet 42 that is disposed on the diffusion sheet 3, and the first light converging sheet 42 that is disposed on the second light converging sheet 41. In this embodiment, the light source 1 is a light tube that is disposed on a lateral side of the light guide plate 2, and the backlight module is a side-edge backlight module and further includes a reflector plate 12 that is disposed around the light source 1. It should be noted that the light converging sheet unit 4 of this invention could be applied to a direct-type backlight module as well.

Light produced from the light source 1 is reflected by the reflector plate 12 and is directed towards the diffusion sheet 3 via the light guide plate 2. The diffusion sheet 3 has a plurality of diffusion structures that project from a base layer thereof towards the second light converging sheet 42. Thus, the light entering the diffusion sheet 3 can be scattered and evenly transmitted towards the second light converging sheet 42.

The first light converging sheet 41 has a base layer 410, and a plurality of first light converging micro-prism structures 411 that protrude from a top surface of the base layer 410 and that extend in a first direction 51. The second light converging sheet 42 has a base layer 420, and a plurality of second light converging micro-prism structures 421 that protrude from a top surface of the base layer 420 and that extend in a second direction 52 different from the first direction 51. In this embodiment, the second direction 52 is transverse to the first direction 51. In this embodiment, the first light converging sheet 41 is stacked on top of the second light converging sheet 42, the first light converging micro-prism structures 411 are parallel-arranged triangular prisms, and the second light converging micro-prism structures 421 are parallel-arranged triangular prisms as well.

Each of the first and second light converging micro-prism structures 411,421 has a peak 415,416 and two smooth inclined surfaces that meet at the peak 415,416. The first light converging micro-prism structures 411 have a first average peak-to-peak distance (d1) between adjacent ones of the first light converging micro-prism structures 411. The second light converging micro-prism structures 421 have a second average peak-to-peak distance (d2) between adjacent ones of the second light converging micro-prism structures 421.

Examples of the First Preferred Embodiment

Examples 1-6 belonging to the first preferred embodiment of the light converging sheet unit and Comparative examples 1 to 3 were tested. Results are shown in Table 1. Each of Examples 1-6 has the second average peak-to-peak distance (d2) equal to 50 μm. However, Examples 1-6 have different values for the first average peak-to-peak distance (d1), which are shown in Table 1. Each of Comparative examples 1-3 has the first average peak-to-peak distance (d1) greater than 35 μm, and the second average peak-to-peak distance (d2) equal to 50 μm. Direct observation for Newton-rings was conducted.

TABLE 1

| Sample | d1 (μm) | Central luminance (nits) | Central luminance percentage (%) | Newton-rings |
| --- | --- | --- | --- | --- |
| Example 1 | 35 | 2615 | 93.2 | Slightly observed |
| Example 2 | 30 | 2620 | 93.4 | Slightly observed |
| Example 3 | 24 | 2538 | 90.5 | Not observed |
| Example 4 | 20 | 2540 | 90.6 | Not observed |
| Example 5 | 13 | 2351 | 83.8 | Not observed |
| Example 6 | 5 | 2093 | 74.6 | Not observed |
| Comparative example 1 | 50 | 2805 | 100 | Very evident |
| Comparative example 2 | 45 | 2660 | 94.8 | Very evident |
| Comparative example 3 | 40 | 2636 | 94.0 | Slightly evident |

Referring to Table 1, Newton-rings were very evident for Comparative examples 1 and 2 since values of the first average peak-to-peak distance (d1) of Comparative examples 1 and 2 are respectively equal to 50 μm and 45 μm, and are relatively high. Regarding Comparative example 3 having the first average peak-to-peak distance (d1) equal to 40 μm, Newton-rings were slightly evident. When Comparative example 3 was covered with an LCD panel, Newton-rings were still observed. Example 1 having the first average peak-to-peak distance (d1) equal to 35 μm and Example 2 having the first average peak-to-peak distance (d1) equal to 30 μm are able to efficiently prevent generation of Newton-rings. On the surfaces of Examples 1 and 2, Newton-rings were slightly observed. When Examples 1 and 2 were covered with LCD panels, no Newton-rings were observed. Considering Examples 1 and 2, when the first average peak-to-peak distance (d1) is limited to a value equal to 35 μm or slightly less than 35 μm, prevention of Newton-rings can be preliminarily achieved. Examples 3, 4, 5, and 6 (the first average peak-to-peak distance (d1) thereof are respectively equal to 24 μm, 20 μm, 13 μm, and 5 μm) are able to retain sufficient luminance for displays and to minimize optical interference as well (since no Newton-rings were observed).

When the first average peak-to-peak distance (d1) of the first light converging sheet 41 is less than or equal to 35 μm, and the first and second light converging sheets 41 and 42 are used together in an LCD, the light converging sheet unit 4 of this invention is able to converge light in both of the first and second directions 51,52 for maintaining brightness of the LCD, and to reduce optical interference for alleviating phenomenon of Newton-rings. The conventional upper diffusion sheet is not required for the backlight module including the light converging sheet unit 4, therefore lowering production costs.

Figure 3:
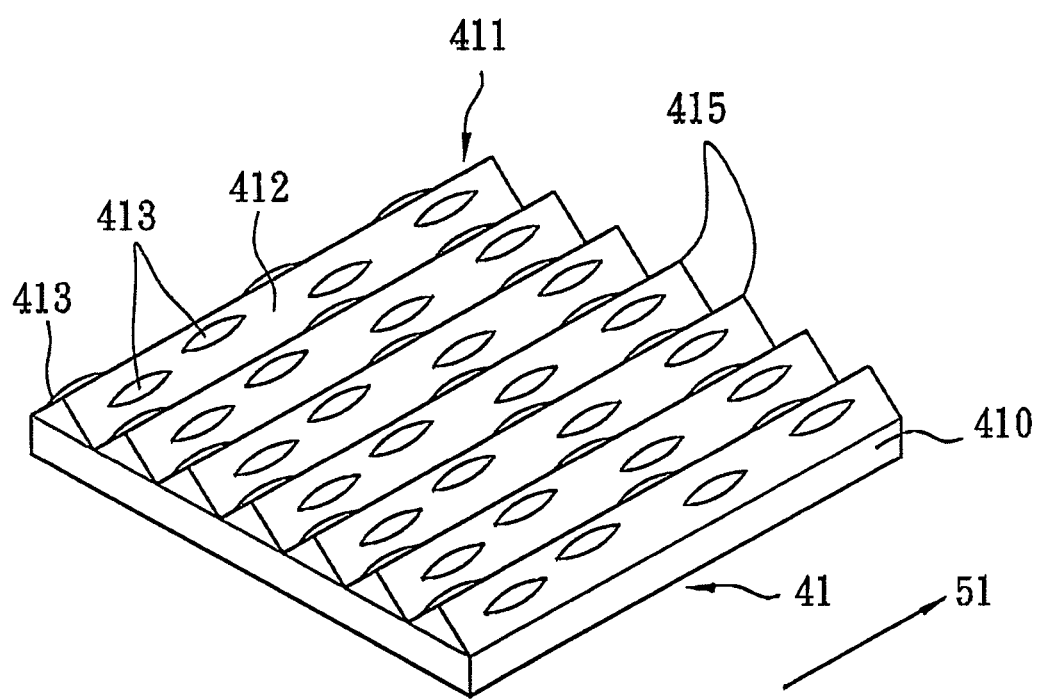
FIG. 3 is a perspective view to illustrate a first light converging sheet of the second preferred embodiment of the light converging sheet unit according to this invention.
Figure 4:
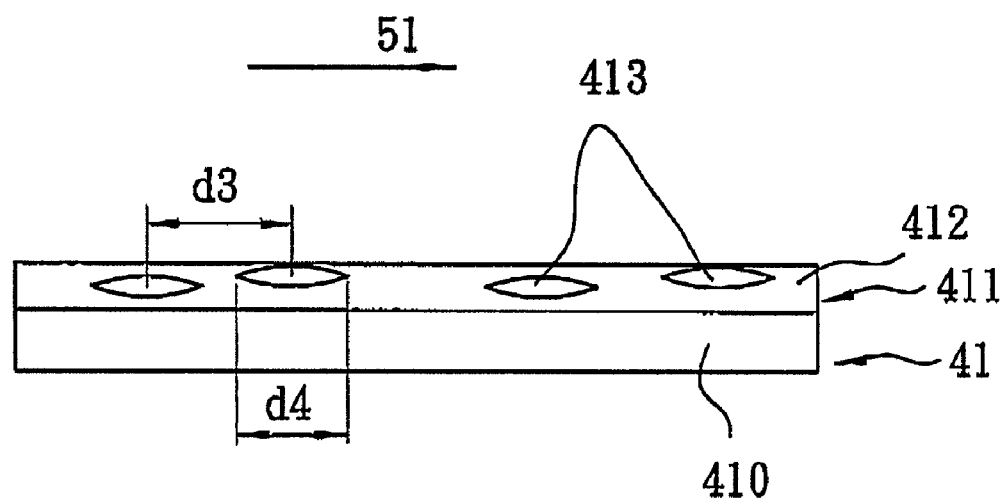
FIG. 4 is a side view of the first light converging sheet of the second preferred embodiment.

Referring to FIGS. 3 and 4, the first light converging sheet 41 of the second preferred embodiment of the light converging sheet unit according to the present invention is similar to the first light converging sheet 41 of the first preferred embodiment except that each of the first light converging micro-prism structures 411 of the first light converging sheet 41 of the second preferred embodiment includes a main body 412, which has the peak 415 and the two inclined surfaces meeting at the peak 415, and a plurality of protrusions 413 projecting from the inclined surfaces of the main body 412. It should be noted that the protrusions 413 could be formed on only one of the inclined surfaces of the main body 412 in other embodiments.

The protrusions 413 that are formed on the same one of the inclined surfaces have an average center-to-center distance (d3) in the first direction 51 between adjacent ones of the protrusions 413. The average center-to-center distance (d3) of the protrusions 413 is not larger than 1 mm. The aforementioned average value is adopted since a single center-to-center distance in the first direction 51 between the adjacent ones of the protrusions 413 that are formed on the same one of the inclined surfaces may slightly vary. The protrusions 413 have an average largest length (d4) that is not smaller than 5 μm. Similarly, the abovementioned average value is taken because a single largest length of one of the protrusions 413 may slightly vary. The protrusions 413 roughen the first light converging micro-prism structures 411, thereby increasing structural disorder of the same. Consequently, the first light converging micro-prism structures 411 are able to scatter some light via the protrusions 413, but a light converging capability thereof is somewhat decreased. Nevertheless, the first light converging sheet 41 is still capable of maintaining sufficient brightness for an LCD. Moreover, the first light converging sheet 41 can lower a regularity of light path so as to reduce Newton-rings, and can decrease rainbows (i.e., chromatic dispersion) induced by the regular smooth inclined surfaces of the main bodies 412.

Examples of the First Light Converging Sheet of the Second Preferred Embodiment

TABLE 2

| Sample | d3 (μm) | d4 (μm) | Central luminance gain value (%) | Newton-rings | Rainbows |
| --- | --- | --- | --- | --- | --- |
| Example 7 | 120 | 60 | 47.5 | Not observed | Not observed |
| Example 8 | 240 | 120 | 48.0 | Not observed | Not observed |
| Example 9 | 220 | 100 | 48.5 | Not observed | Not observed |
| Example 10 | 80 | 5 | 47.6 | Not observed | Not observed |

Referring to Table 2, Examples 7, 8, 9, and 10 are samples of the first light converging sheet 41 of the second preferred embodiment, and have different values for the average center-to-center distance (d3) of the protrusions 413 and the average largest length (d4) of the protrusions 413. Examples 7-10 were tested using a light source (luminance=3200 nits) of a direct-type backlight module. Example 7 has the first average peak-to-peak distance (d1) equal to 24 μm. A central luminance gain value in Table 2 is the percentage increased in central luminance of the light passing through the first light converging sheet 41 relative to the luminance of the light source. Normally, the central luminance gain value is required to be larger than 47%. The central luminance gain value can be further increased by adjusting a refractive index of the first light converging micro-prism structures 411.

Certainly, Examples 7-10 are able to increase the central luminance since the central luminance gain values thereof are at least 47.5%. The protrusions 413 can scatter some light and hence have shielding effects on the optical flaws. Newton-rings and rainbows were not observed. When the average largest length (d4) of the protrusions 413 is equal to 5 μm (Example 10), the first light converging sheet 41 is capable of scattering light and shielding the optical flaws.

Nevertheless, the average center-to-center distance (d3) of the protrusions 413 should not be too large regarding light scattering ability and physical appearance of the first light converging sheet 41. Preferably, the average center-to-center distance (d3) of the protrusions 413 is not larger than 1 mm. More preferably, the average center-to-center distance (d3) of the protrusions 413 is not larger than 500 μm. Accordingly, the protrusions 413 can be prevented from being easily identified on the inclined surfaces of the main bodies 412, and light scattering can be accomplished as well. The first light converging sheet 41 can be solely used and disposed on optical sheets of other backlight modules so as to mitigate the phenomenon of Newton-rings.

Figure 5:
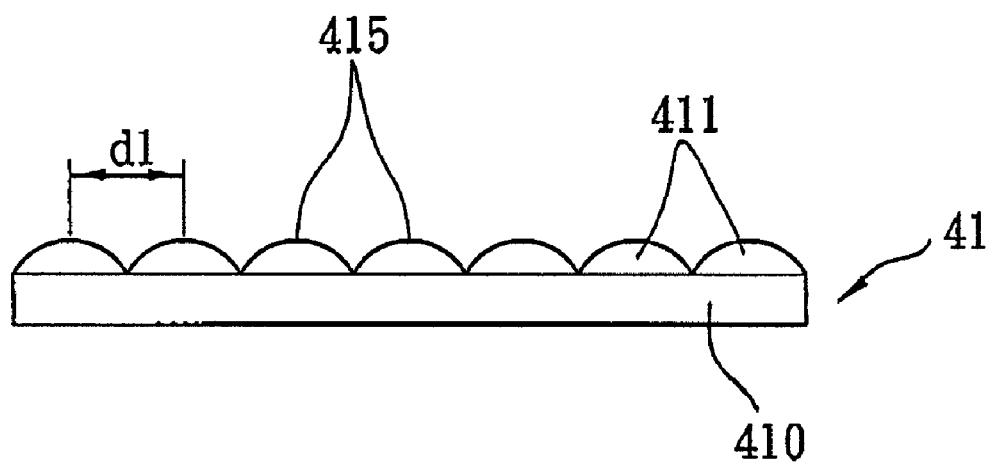
FIG. 5 is a front view to illustrate the first light converging sheet of the third preferred embodiment of the light converging sheet unit according to this invention.

Referring to FIG. 5, the first light converging sheet 41 of the third preferred embodiment of the light converging sheet unit according to the present invention is similar to the first light converging sheet 41 of the first preferred embodiment except that each of the first light converging micro-prism structures 411 of the third preferred embodiment has a curved surface. It should be noted that each of the second light converging micro-prism structures (not shown) of this embodiment could be formed to have a curved surface as well.

Figure 6:
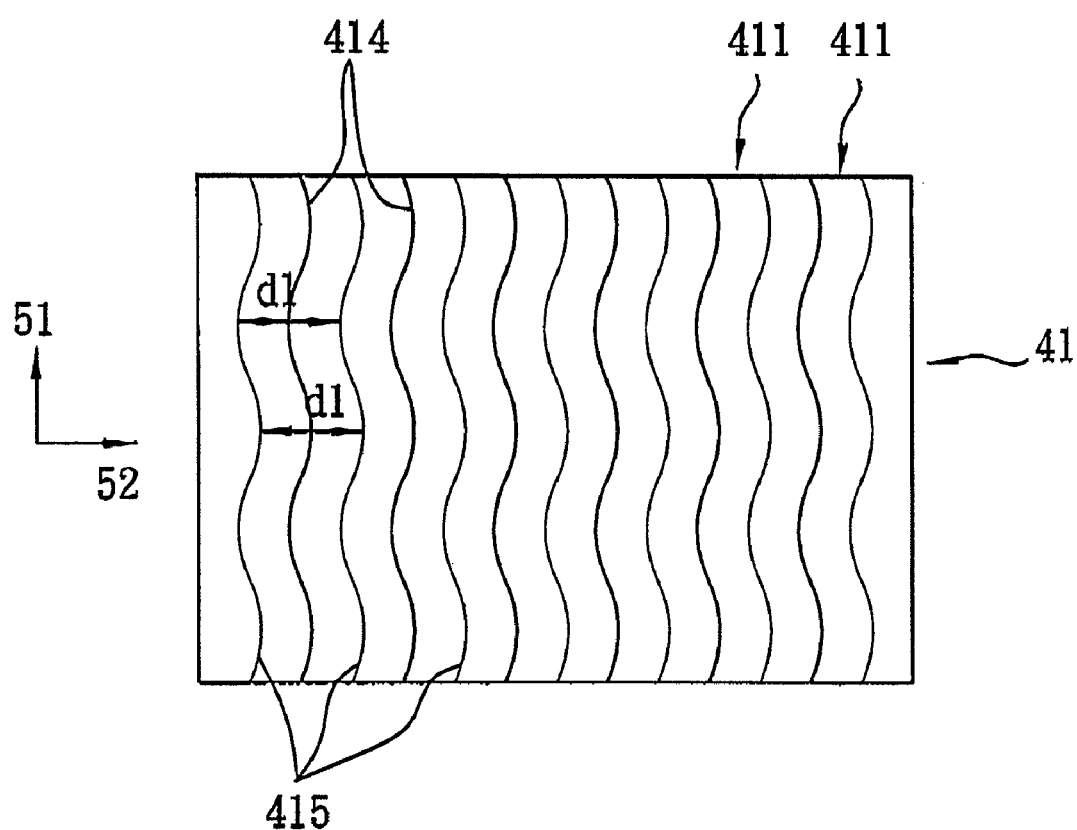
FIG. 6 is a top view to illustrate the first light converging sheet of the fourth preferred embodiment of the light converging sheet unit according to this invention.

Referring to FIG. 6, the first light converging sheet 41 of the fourth preferred embodiment of the light converging sheet unit according to the present invention is similar to the first light converging sheet 41 of the first preferred embodiment except that the peaks 415 of the first light converging micro-prism structures 411 are regularly winding and evenly arranged in the second direction 52. Valleys 414 are formed by the adjacent ones of the first light converging micro-prism structures 411 and are also regularly winding. When the peak-to-peak distance between the adjacent ones of the first light converging micro-prism structures 411 is measured at different locations, the same value is obtained. It should be noted that the peaks 415 and the valleys 414 of the first light converging micro-prism structures 411 could be irregularly winding in other embodiments. When the peaks 415 of the first light converging micro-prism structures 411 are irregularly winding, the peak-to-peak distance between the adjacent ones of the first light converging micro-prism structures 411 may vary. As a result, the peak-to-peak distance between the adjacent ones of the first light converging micro-prism structures 411 must be measured at sufficient locations. Thus, the first average peak-to-peak distance (d1) can be considered accurate.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:
1. A light converging sheet unit comprising:
a first light converging sheet having a base layer, and a plurality of first light converging micro-prism structures that protrude from a top surface of said base layer and that extend in a first direction; and
a second light converging sheet having a base layer, and a plurality of second light converging micro-prism structures that protrude from a top surface of said base layer of said second light converging sheet and that extend in a second direction different from the first direction, said first and second light converging sheets being stacked one on top of the other;

wherein said first light converging micro-prism structures have a first average peak-to-peak distance between adjacent ones of said first light converging micro-prism structures, and said second light converging micro-prism structures have a second average peak-to-peak distance between adjacent ones of said second light converging micro-prism structures, at least one of the first and second average peak-to-peak distances being not larger than 35 μm.

2. The light converging sheet unit as claimed in claim 1, wherein at least one of the first and second average peak-to-peak distances is not larger than 24 μm.

3. The light converging sheet unit as claimed in claim 1, wherein each of said first light converging micro-prism structures of said first light converging sheet has a main body that has a peak, and at least one protrusion that projects from said main body.

4. A light converging sheet comprising:
a base layer; and
a plurality of light converging micro-prism structures protruding from a top surface of said base layer, said light converging micro-prism structures having an average peak-to-peak distance between adjacent ones of said light converging micro-prism structures, which is not larger than 35 μm, each of said light converging micro-prism structures including a main body that has a peak, at least one of said light converging micro-prism structures further including a plurality of protrusions that project from said main body thereof;

wherein each of said light converging micro-prism structures extends in a first direction, said main body of each of said light converging micro-prism structures further having two inclined surfaces that meet at said peak thereof, said protrusions that project from the same one of said inclined surfaces having an average center-to-center distance in the first direction between adjacent ones of said protrusions, the average center-to-center distance being not larger than 1 mm, said protrusions having an average largest length that is not smaller than 5 μm.

5. The light converging sheet as claimed in claim 4, wherein the average peak-to-peak distance of said light converging micro-prism structures is not larger than 24 μm.

6. The light converging sheet as claimed in claim 4, wherein the average center-to-center distance is not larger than 500 μm.

* * * * *